United States Patent [19]

Frink

[11] Patent Number: 4,870,571
[45] Date of Patent: Sep. 26, 1989

[54] INTERCOMPUTER COMMUNICATIONS BASED ON MESSAGE BROADCASTING WITH RECEIVER SELECTION

[75] Inventor: John G. Frink, Columbia, Md.
[73] Assignee: The Johns Hopkins University, Baltimore, Md.
[21] Appl. No.: 491,434
[22] Filed: May 4, 1983
[51] Int. Cl.⁴ .......................................... G06F 15/16
[52] U.S. Cl. .................... 364/200; 364/229.2; 364/514
[58] Field of Search .............. 364/514, 200, 418, 900; 375/107; 370/85, 94; 340/825.3, 825.34, 825.35, 825.52; 235/385; 179/175.2

[56] References Cited

U.S. PATENT DOCUMENTS

| | | | |
|---|---|---|---|
| 4,019,176 | 4/1977 | Cour et al. | 364/900 |
| 4,107,656 | 8/1976 | Farnsworth | 375/107 |
| 4,123,796 | 10/1978 | Shih | 364/418 |
| 4,446,341 | 5/1984 | Rubin | 179/175.2 |
| 4,506,360 | 3/1985 | Kryskow et al. | 370/85 |
| 4,525,861 | 6/1985 | Freeburgh | 455/137 |
| 4,530,051 | 7/1985 | Johnson et al. | 364/200 |
| 4,536,838 | 8/1985 | Ringel et al. | 364/200 |

OTHER PUBLICATIONS

Computer Dictionary Handbook, Howard W. Sams & Co., (1980), p. 11.

Primary Examiner—Salvatore Cangialosi
Attorney, Agent, or Firm—Robert E. Archibald; Howard W. Califano

[57] ABSTRACT

An apparatus and method of intercomputer communications based on message broadcast with receiver selection is taught. A distributed computer system is described in which each computing element includes a hardware message filter which provides content tag recognition and selection. The overall system architecture allows software modularity and both hardware and software extensibility. The message filter can be preset or dynamically programmed, and can be operated in conjunction with a serial or parallel broadcast bus.

17 Claims, 2 Drawing Sheets

*NONRECOGNITION OF CONTENT TAG
**RECOGNITION OF CONTENT TAG

INTERCOMPUTER COMMUNICATIONS BASED ON MESSAGE BROADCASTING WITH RECEIVER SELECTION

STATEMENT OF GOVERNMENTAL INTEREST

The Government has rights in this invention pursuant to Contract No. N00024-81-C-5301 awarded by the Department of the Navy.

BACKGROUND AND/OR ENVIRONMENT OF THE INVENTION

1. Field of the Invention

The present invention pertains generally to an apparatus and method of intercomputer communication, and more particularly to a low level message filter which provides content tag recognition and selection independent of the higher level processing occurring in an individual computing element.

2. Description of the Contemporary and/or Prior Art

As a result of the recent advances in solid-state circuit technology, distributed computer systems, using many smaller processors, is becoming a practical alternative to the highly centralized large-computer systems currently in use. Increased throughput, fault tolerance, inherent software modularity, and ease of system expansion are often mentioned as potential advantages of distributed over centralized architectures. However, most of the many possible distributed architectures are untried and, in general, each trades some advantages for others. Therefore, ease of system expansion, enabling one to accommodate many different computing elements on the same bus, is of particular interest.

Current distributed systems are costly to expand and upgrade and often require significant software module redesign and hardware interface redesign. The prior art does not teach a method of intercomputer communication which facilitates the integration of new systems with existing systems, and does not teach hardware message filtering responsive to the content of the data message.

Prior art devices, such as disclosed in U.S. Pat. No. 4,123,796 issued Oct. 31, 1978 to J. Y. Shih, utilize a transceiver connected to a data bus for communicating with a plurality of control devices. In the one-to-many communications system as taught by Shih, each module is given a unique address and the transceiver prefixes each data message by the address of the module, or modules, with which it wishes to communicate. The Shih reference does not teach the use of a content tag which allows each computer element to selectively receive data messages based on the relevancy of these date messages to the software modules processed by the computing element.

Similarly, U.S. Pat. No. 4,019,176 issued on Apr. 19, 1977 to Cour et al describes an intercomputer communication scheme in which all stations receive and select messages based on a "destination address code". The reference does not teach receiver selection based on the content of the data message.

The prior art does not teach the use of a low level message filter which processes content tags independent of the higher level processing occurring in an individual computing element.

SUMMARY OF THE INVENTION

The present inventor recognized that intercomputer communication for an extensible or a distributed computing system would best be accomplished by receiver selection of data messages based on the content of those messages. Similarly, the present inventor recognized that a low level message filter could process the content tags independent of the higher level processing occurring in each computing element.

As taught by the present invention, a "sending computing element" transmits a data message prefixed by an n-bit content tag. The content tag classifies the data message in terms of its content. The content tag is transmitted over the common broadcast bus to a set of independent computing elements. Each computing element is loaded with software processes, each of which has certain data requirements. A hardware message filter, associated with each computing element, is responsive to the content tags, and flags the computing element when a data message appears over the common broadcast bus which has relevance to its software. The message filter can be preset or dynamically programmed by the computing element as its data requirements charge.

An example might better explain the advantages of message broadcasting with receiver selection. A distributive computing system used in a grocery store chain might contain a series of independent computers, with each computer having one or more designated functions, i.e., a first computer calculates total sales tax, a second computer keeps track of can goods inventory, and a third computer keeps track of household inventory. A cash register or terminal would transmit data messages prefixed by a content tag. Each computing element would have a message filter which selects only data messages relevant to its unique function. If a household product was sold, for example, the first computer would like to know so that it could keep track of total sales tax, and a third computer would like to know so it could keep track of household inventory. The cash register or terminal need not know what computing system requires the data, as with the prior art devices.

In order to accomplish "receiver selection" in an efficient manner, the present invention discloses a low level message filter which operates independent of the higher level processing occurring in the computing element. The content tag is used by the message filter to address a memory unit. Each memory location addressed by a content tag is pre-loaded with a "1", if the content tag is relevant to the particular computing element, or "0" if the content tag corresponds to a data message which is irrelevant to software routines processed by the particular computing element. (It is within the contemplation of this invention to identify a relevant content tag by storing a value other than "1" in the particular memory location; the choice of "1" is arbitrary.)

The message filter can consist of a preset memory unit or a dynamically programmable memory unit. The preset version basically comprises a ROM connected to the common broadcast bus and addressed by the content tag. An enable control line enables the memory unit when a content tag appears over the common broadcast bus. If a memory location addressed by the content tag contains a "1" the computing element is alerted that a relevant data message will appear on the broadcast bus during the current message transfer cycle and provisions are made by a bus interface unit to transfer the data directly into the computer's memory.

A dynamically programmable message filter is also envisioned by the present invention, and generally comprises: a read/write memory; and an arbiter means and a multiplexer means which jointly cooperate to operably multiplex the n-bit address line between the common broadcast bus and the particular computing element. The computing element can address each memory location and program that location with "1" or a "0" to designate relevant content tags. When a content tag appearing over the common bus addresses a particular memory location set with a "1", a flag alerts the computing element to receive relevant data; if, however, the addressed memory location stores a "0" the data is not retrieved.

The invented dynamically programmable message filter uniquely allows software extensibility. Each computing element is loaded with software which includes one or more broadcast element modules and an executive module. Each broadcast element module is an independent software module which has specific data message requirements and which can be loaded in any host computing element capable of executing the computer program. The software module alerts the executive module of its data requirements which in turn programs the message filter to identify certain corresponding content tags. In this manner, a particular software module need not know the identity of its current host computing element, or the identity of computers hosting other software modules in the system. The invented system architecture will permit any program to be performed by any equally capable computer.

The invented method and apparatus can be used with either a parallel or a serial common broadcast bus. Similarly, other modifications are contemplated including a memory location storing m-bits for each of the possible $2^n$ messages allowing further classification or prioritizing of the data messages.

A first object of the present invention is to provide a method and apparatus for intercomputer communication based on message broadcast with receiver selection.

A second object of the present invention is a use of a content tag which allows receiving computing elements to select data messages based on the content of those data messages.

A third object of the present invention is the use of a low level message filter which provides content tag recognition and selection independent of the higher level processing occurring in the individual computing element.

A fourth object of the present invention is the use of a ROM memory unit, preset to select particular content codes.

A fifth object of the present invention is the use of a dynamically programmable memory unit, which is programmable by the computing element to select different content codes to satisfy changing software requirements.

A sixth object of the present invention is the use of a dynamically programmable message filter, which allows an extensible modular software architecture.

These objects, as well as other objects and advantages of the present invention will become readily apparent after reading the ensuing description of several non-limiting illustrative embodiments and viewing the accompanying drawings.

BRIEF DESCRIPTION OF THE DRAWINGS

In order that the present invention may be more fully understood, it will now be described, by way of example, with reference to the accompanying drawings, in which.

DESCRIPTION OF THE PREFERRED EMBODIMENTS

Figure 1:
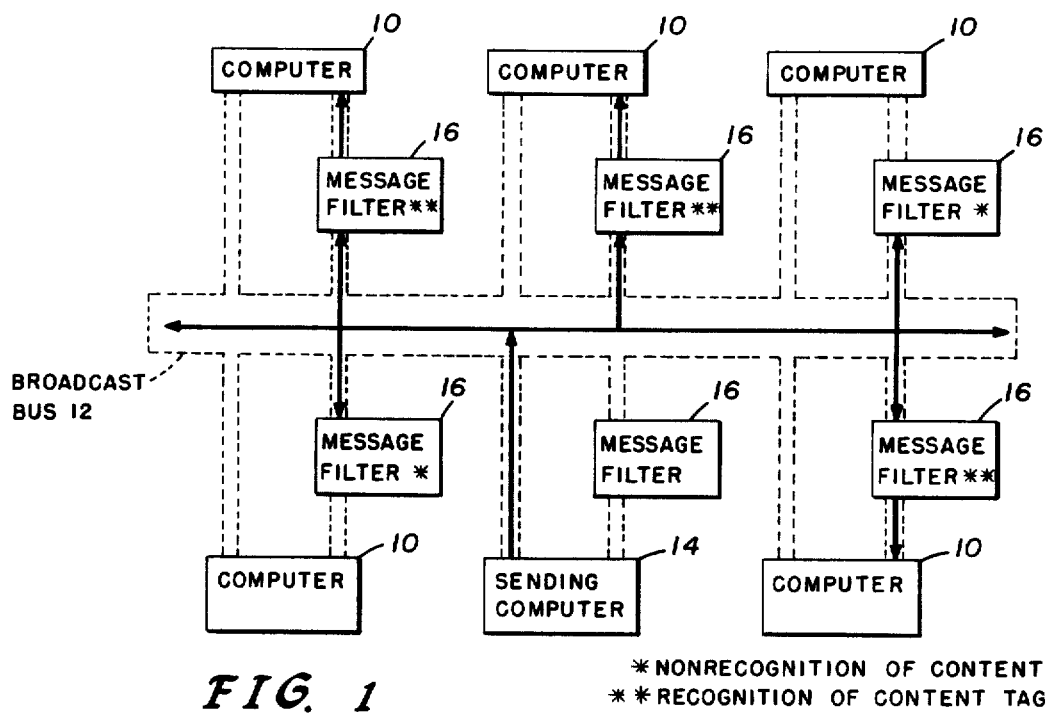
FIG. 1 is a block diagram of a distributive computing system using the invented intercomputing scheme.

FIG. 1 illustrates the invented distributed computer system in block diagrammatic form. Each computing element 10 can transmit and receive information over common broadcast bus 12. For purposes of illustration, computing element 14 is acting as a "sending computer" and is broadcasting a message along the broadcast bus 12. The "sending computer" gains access to the broadcast bus using one of the existing arbitration schemes. The message is prefaced with a content tag which identifies the subject content of the message. Each computing element contains a message filter which identifies content tags and accepts only those data messages associated with content tags relevant to software modules resident within that computing element. The message filter is a low level data filter which provides content tag recognition and selection independent of the higher level processing occurring in the host computer. Such a hardware message filter processes content tags more efficiently than higher lever processing. The message filter can be preset to select only certain content tags or can be dynamically programmed by the host computing element 10 to select certain content tags. The "sending computer" 14 need not know what, if any, computing elements will be receiving the message. Conventional systems required the "sending computer" to know and designate each receiving computer.

Figure 2:
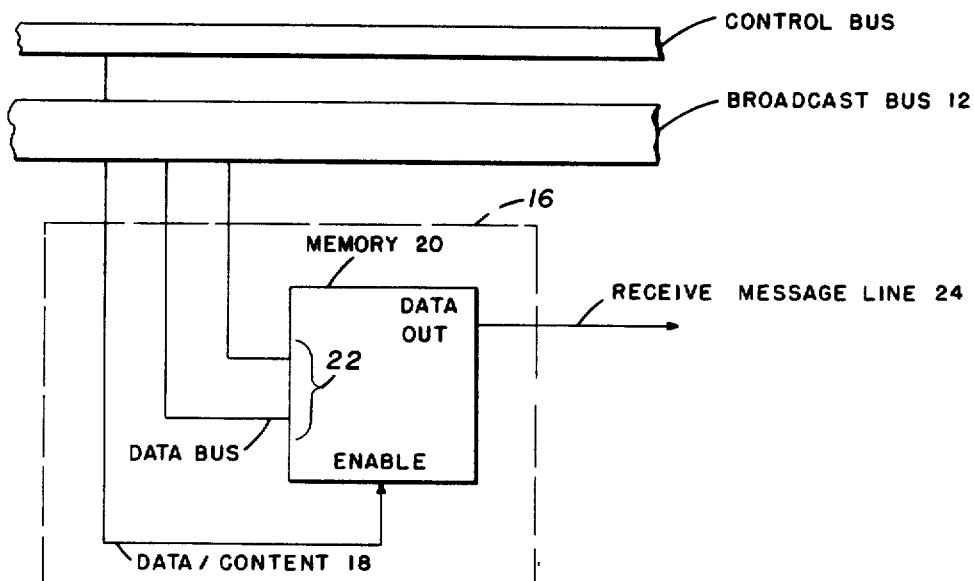
FIG. 2 is a block diagrammatic view of a preset message filter using a ROM memory unit.

FIG. 2 is block diagram of the message filter according to the present invention which is preset to respond to certain content tags. The message filter 16 connects to the broadcast bus 12, which in this embodiment is a parallel bus, and to a DATA/CONTENT control line 18. The message filter 16 generally contains a memory unit 20 which can be a read only memory (ROM) comprising a single or a plurality of memory chips. The DATA/CONTENT control line 18 is actuated by the "sending computer" 14 when the broadcast bus 12 is loaded with a content tag, which in turn enables memory unit 20. (If, memory unit 20 is a single ROM chip, the DATA/CONTENT control line could connect to the chip enable line). When memory unit 20 is enabled, the common parallel data bus connects directly to the n-bit address line 22 of memory unit 20. After the memory unit 20 is enabled, the content tag appears over the parallel common data bus 12 and addresses a particular location in memory unit 20. The memory unit 20 has a "1" or "0" stored in each memory location which indicates the relevance of that content tag to the host computing element. Data read from memory unit 20 appears along the Received Message line 24. If the content tag addresses a memory location storing a "0", the Message Receive line is not asserted; if, however, the content tag identifies a memory location storing "1", the Receive Message line 24 will be asserted. When the Receive Message 24 is asserted, the bus interface unit of the host computing element 10 will then prepare to receive the data message that will be subsequently transmitted over broadcast bus 12.

Figure 3:
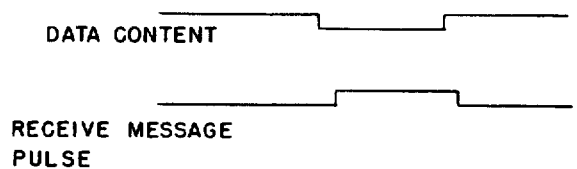
FIG. 3 is timing diagram for the preset message filter.

FIG. 3 is, by way of example, a timing diagram illustrating the operation of the message filter. The DATA/CONTENT control line goes low when a content tag is on the bus and enables the memory unit. When the memory unit identifies a relevant content tag, the Receive Message flag line goes high. After receiving the Receive Memory flag, the computing element prepares to receive the data.

Figure 4:
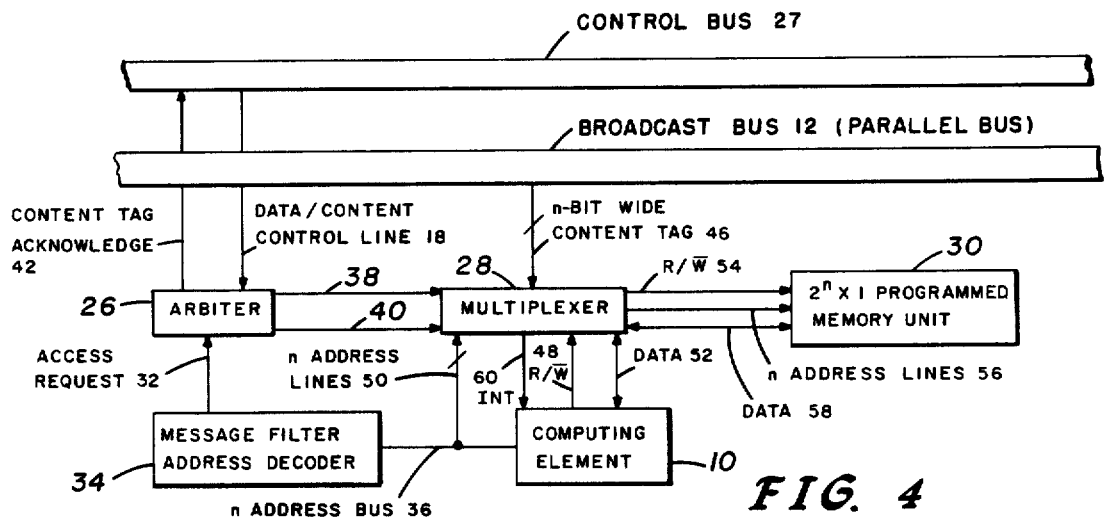
FIG. 4 is a block diagram of a dynamically programmable message filter.

FIG. 4 is a block diagrammatic view of a dynamically programmable message filter as taught by the present invention. The dynamic message filter generally comprises: an arbiter 26 connected to control bus 27 for arbitrating access to the message filter memory unit 30; a multiplexer 28 controlled by arbiter 26 and connected to the broadcast bus 12 and the host computing element 10 for allowing either the host computing element 10 to read or write onto the memory unit 30, or allowing the parallel broadcast bus 12 access to the n-bit address line of the message unit 30; and, a programmable read/write memory unit with each memory address dynamically programmable.

Arbiter 26 is a digital logic arrangement which receives as input the DATA/CONTENT control line 18 and an Access Request 32 from host computing element 10. The Access Request flag 32 is generated by a Message Filter Address Decoder 34 which operably connects to the host computing element 10 via address bus 36. The arbiter 26 has two output lines which operably connect to multiplexer 28. When line 38 is asserted multiplexer 28 allows the host computing element 10 access to memory unit 30; alternatively, when control line 40 is asserted multiplexer 28 enables the broadcast bus to connect to the n-bit address line associated with memory unit 30. The arbiter 26 also asserts a Content Tag Acknowledgement flag over an open common collector acknowledgement line 42. The Content Tag Acknowledgement flag 42 is asserted by arbiter 26 after the message filter associated with that particular host computing element has reviewed the content tag currently on the common data bus 12. The "sending computer" waits for acknowledgement from each receiving computer before the data message is transmitted. The Content Tag Acknowledgement flag 42 is asserted by each computing element whether or not it desires to receive the particular data message.

Figure 5:
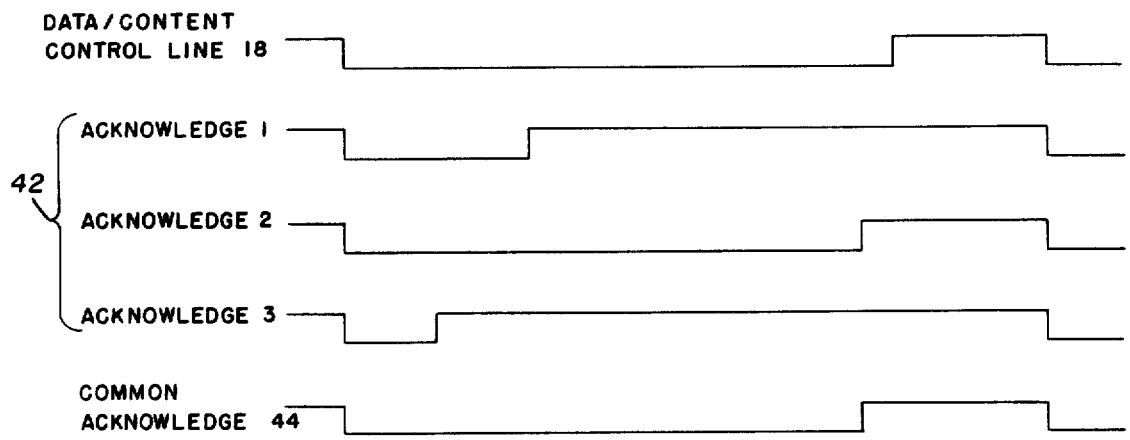
FIG. 5 is timing diagram illustrating the operation of the common acknowledgement control line; and, FIG. 6 is a block diagram of a dynamically programmable message filter used in combination with a serial broadcast bus.

FIG. 5 illustrates the operation of the Content Tag Acknowledgement control line. The DATA/CONTENT control line 18 goes low when a content tag appears on the common data bus 12. Each computing element asserts a positive acknowledgement signal when its corresponding message filter has processed the content tag. When all the acknowledged signals are high, the common acknowledgement line 44 goes high. When the common open collector acknowledgement line 44 goes high, the "sending computer causes the DATA/CONTENT line to go high and transmits the data message over the common data bus 12.

Referring to FIG. 4, multiplexer 28 receives as inputs an n-bit wide content tag 46 appearing on broadcast bus 12; a read/write (R/W) control signal 48 from computing element 10; a n-bit address line 50 from computing element 10 for accessing memory locations in memory unit 30; and, a data bus 52 associated with computing element 10 for reading data from or storing data in memory unit 30. Multiplexer 28 is controlled by control lines 38 and 40 from arbiter 26, which directs the multiplexer to either allow the R/W control line 48, data bus 52 and address bus 50 assess to memory unit 30; or alternatively, allow the n-bit wide content tag 46 access to the memory unit's n-bit address line 56. Multiplexer 28 provides as output: R/$\overline{W}$ 54 which allows the host computing element 10 to read out or write data into the memory unit 30; a n-bit address line 56 for accessing a particular memory location in the memory unit 30; a data bus 58 which allows the host computing element 10 to record data into or read data from a particular memory location; and, an INT flag 60 which is asserted when a content tag address a memory location containing a "1". The INT flag 60 causes the bus interface unit of the computing element 10 to transfer data directly into the computer's memory and to commence processing message data which will subsequently appear on the common bus 12.

The memory unit 30 is a $2^n \times 1$ programmable read/write memory. It is dynamically programmed by the host computing element 10 so that a memory location addressed by a particular content tag can be programmed to a "1" if the data is relevant, and a "0" if the date is not relevant. Data stored in the memory location is sent to the multiplexer 28 via line 56. A "1" asserted along line 56 causes multiplexer 28 to assert an INT flag 60 which instructs the host computer 10 to commence processing message data which will subsequently appear over common bus 12.

Although the embodiment shown in FIG. 4 contains a $2^n \times 1$ memory unit, it is within the contemplation of this invention to use a $2^n \times m$ message filter. The m-bits stored in each memory location will include the bit discussed above plus additional bits which provide further filtering based on priorities, message classification and/or and access privileges. The additional stored bits can be processed by computing element 10 or by additional hardwire filtering as taught by this invention.

In operation, the host computing element can dynamically program the message filter to respond to selected content tags as required by software modules resident in that computing element. To accomplish this the host computing element 10 (through an executive software module) first addresses the message filter along address bus 36. In response to this address, Message Filter Address Detector 34 actuates an Access Request flag 32, thereby directing arbiter 26 and multiplexer 28 to provide the host computing element 10 with access to memory unit 30. arbiter 26 may delay the host computing element's request if a content tag is also available over data bus 12. Once the host computing element 10 has access to the memory unit, data line 52, address bus 50, and R/$\overline{W}$ control line 48 are used in a conventional manner to read data from or write data into a particular memory location.

After the filter is dynamically programmed to respond to selected content tags, the memory filter proceeds to alert the when selected data messages appear on the common bus 12. In operation, the arbiter 26, in accordance with its arbitration schedule, will assert the bus control flag 40, when the DATA/CONTENT line goes low. In response to the flag 40, multiplexer 48 operably connects the common bus 12 to the n-bit address line 56 associated with memory unit 30. The data ("1" or "0") stored in the memory location which is selected by the control tag address, will appear as an output along line 58. If the host computing element 10 desired to receive the data message associated with a particular content tag a "1" would be stored in the memory location addressed by that content tag. When the memory location is addressed by that content tag, INT flag 60 will become asserted, notifying the host computing element 10 to commence processing the message data which will appear over broadcast bus 12 during the current data cycle.

Figure 6:
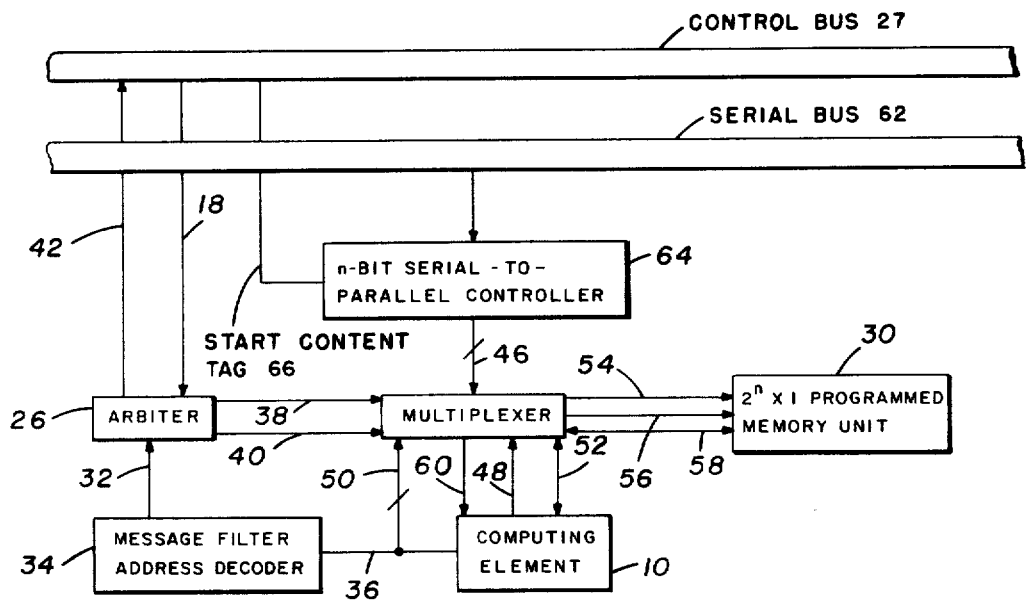

FIG. 6 is a block diagrammatic representation of a dynamic memory filter used in combination with a serial broadcast data bus. In this embodiment an n-bit serial to parallel converter 64 receives as inputs: a start content tag control line 66; and, serial data transmitted over serial bus 62. The n-bit serial to parallel converter 64 provides an n-bit wide content tag address as an output which is operably connected to multiplier 28. Multiplexer 28, arbiter 26, Message Filter Decoder 34 and memory unit 30 operate similar to that previously described in this specification. In operation, the Start Content Tag 66 actuates the n-bit serial to parallel converter 64 when the serial bits representing a content tag data is transmitted along the serial data bus 62. The n-bit serial to parallel converter 64 thus converts the serial bits received into a parallel format. It will be noted that either a preset message filter or a programmable message filter can be used in conjunction with a serial bus.

It will be understood that various changes in the details, arrangement of parts, and operable conditions which have been herein described and illustrated in order to explain the nature of the invention may be made by those skilled in the art within the principles and scope of the present invention.

Having thus set forth the nature of the invention, what is claimed is:

1. An apparatus for intercomputer communication, comprising:
 a common broadcast bus for carrying data messages, each data message prefixed by an n-bit content tag wherein said content tag identifies the information content of each particular data message;
 a plurality of computing elements operably connected to said common bus; and,
 a plurality of message filters, each one of said message filters connected to said common broadcast bus and paired with a particular computing element, wherein each one of said message filters is responsive to a set of content tags for alerting said particular computing element to receive a data message appearing over said common data bus if and only if the content tag of the data message is within the set of content tags associated with said particular message filter.

2. The apparatus of claim 1, wherein at least a portion of said message filters are preset to respond to a set of content tags.

3. The apparatus of claim 1, wherein at least a portion of said message filters are programmable by said particular computing element to respond to a set of content tags.

4. The apparatus of claim 2, wherein each one of said message filters further comprises:
 a read only memory unit having an n-bit address line operably coupled to said common data bus, wherein each content tag addresses a particular memory location, said particular memory location having a preset value so as to flag said particular computing element when relevant data is available over said common broadcast bus; and,
 a common control line for enabling said read only memory unit while said n-bit content tag is loaded on said common data bus.

5. The apparatus of claim 4, wherein said preset value is a "1" if the content tag corresponds to a data message relevant to said particular computing element, and wherein said preset value is "0" if the content tag corresponds to a data message irrelevant to said particular computing element.

6. The apparatus of claim 5, wherein said preset value of "1" flags said particular computing element to receive the data message appearing over said common bus during the current data transmission cycle.

7. The apparatus of claim 3, wherein each one of said message filters further comprises:
 a programmable memory unit having an n-bit address line operably multiplexed between said common broadcast bus and said particular computing element, wherein each content tag addresses a particular memory location, and wherein each memory location is operably programmable by said particular computing element so that said particular computing element is flagged to receive message data corresponding to the programmable selectable content tags.

8. The apparatus of claim 7, wherein each one of said message filters further comprises:
 a content tag control line for indicating when said common broadcast bus is loaded with a content tag;
 a content tag acknowledgement control line for indicating when said message filter has completed processing the content tag;
 a message filter address decodes means, operably connected to said particular computing element for generating an access request flag when said particular computing element address said message filter;
 an arbiter means responsive to said access request flag and operably connected to said content tag control line and said content tag acknowledged line for arbitrating whether said particular computing element can address said programmable memory unit or whether said common broadcast can address said programmable memory unit with a content tag, and for asserting a flag along said content tag acknowledge line when content tag processing is complete; and,
 a multiplexer means operably connected to said arbiter means, said common broadcast bus, said particular computing element, and said programmable memory unit, for allowing either said particular computing element to read or write data into a particular memory location or allowing said common broadcast bus asserting a content tag to access said programmable memory unit n-bit address line.

9. The apparatus of claim 8, wherein the output from said particular memory location addressed by a content tag is programmable to selectively flag said particular computing element to read the data message appearing over said common broadcast bus during the current data transmission cycle.

10. The apparatus of claim 9, wherein said particular memory location is programmed to store a "1" if the content tag addressing said particular memory location corresponds to a data message relevant to said particular computing element, and wherein said particular memory location is programmed to store a "0" if the content tag addressing said particular memory location corresponds to an irrelevant data message.

11. The apparatus of claim 10, wherein a programmed storage value of "1" flags said particular computing element to receive the data message appearing over said common bus during the current date transmission cycle.

12. The apparatus of claim 7 wherein said particular computing element is loaded with at least one broadcast element module and an executive module, each of said broadcast element modules is an independent software module requiring data messages having specific content tags, and wherein said executive module dynamically programs said memory unit in a manner responsive to said specific content tags.

13. A method of intercomputer communication based on message broadcasting with receiver selection, comprising the steps of:

transmit over a common broadcast bus an n-bit content tag which describes the content of a data message;

each computing element containing a message filter which performs the following steps, read the n-bit content tag appearing over the common broadcast bus, address a memory unit with the n-bit content tag, the memory unit contains a value stored in each memory location addressed by a content tag, said stored value indicates the set of relevant data messages for the computing element, read the value stored in the addressed memory location, flag the computing element when relevant content tags are received.

14. The method of claim 13, wherein said value stored in a memory location is a "1" if that memory location is addressed by a content tag corresponds to a data message relevant to the computing element and wherein said value stored in a memory location is a "0" if that memory location is addressed by an irrelevant content tag.

15. The method of claim 14 wherein said stored values are preset in a read only memory unit.

16. The method of claim 14 wherein said memory unit is programmable and further comprising the step of:

dynamically programming said value stored in each memory location, so that a "1" is stored in these memory location addressed by relevant content tags and a "0" is stored in these memory locations addressed by irrelevant content tags.

17. The method of claim 16 wherein each computing element is loaded with at least one broadcast element module and an executive module, each of said broadcast element modules is an independent software module requiring data messages having specific content tags, and wherein said executive module further performs the steps of assessing the content tags required by each of said broadcast element modules and programming said memory unit to respond to said content tags.

* * * * *